Feb. 25, 1969   A. A. BLYTHE ETAL   3,429,023
MANUFACTURE OF AERODYNAMIC STRUCTURES
Filed July 7, 1965   Sheet 1 of 3
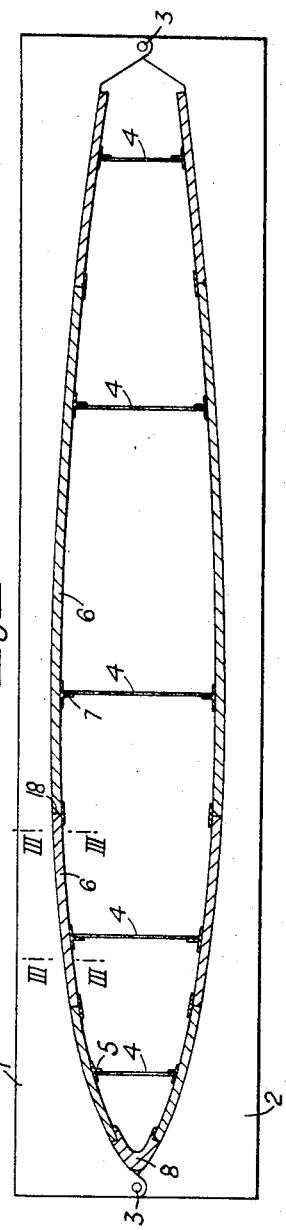
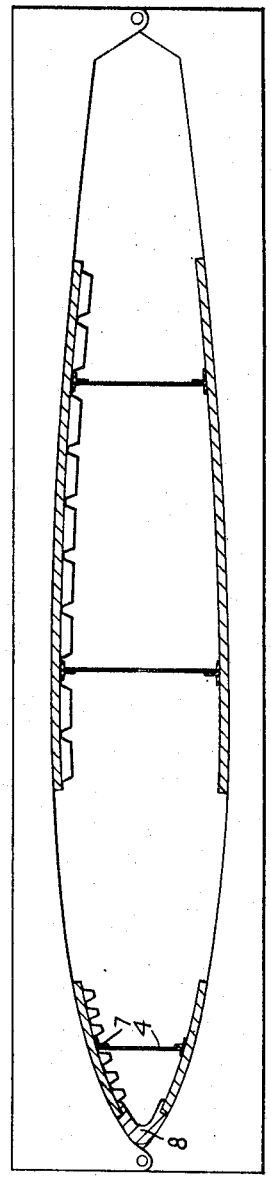
INVENTORS
ALAN A. BLYTHE
VICTOR G. LACHMANN BY  *Imirie & Smiley*
ATTORNEYS

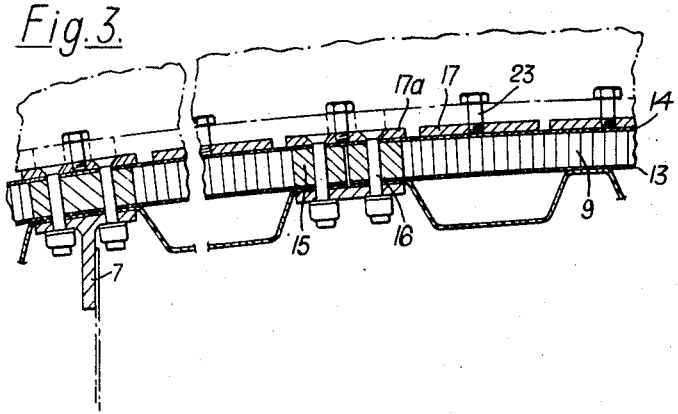
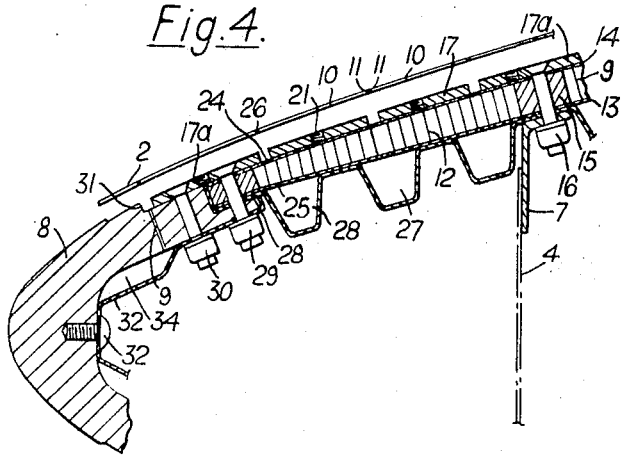
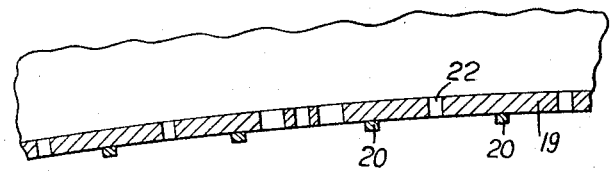

Feb. 25, 1969     A. A. BLYTHE ET AL     3,429,023

MANUFACTURE OF AERODYNAMIC STRUCTURES

Filed July 7, 1965     Sheet 3 of 3

INVENTORS
ALAN A. BLYTHE
VICTOR G. LACHMANN

BY *Imirie & Smiley*

ATTORNEYS 3,429,023
MANUFACTURE OF AERODYNAMIC
STRUCTURES
Alan Avery Blythe, St. Albans, and Victor Gustav
Lachmann, Chorley Wood, England, assignors to
Handley Page Limited, London, England, a
British company
Filed July 7, 1965, Ser. No. 470,180
Claims priority, application Great Britain, July 7, 1964,
27,998/64
U.S. Cl. 29—404        4 Claims
Int. Cl. B23q *17/00;* B32b *3/14;* B64c *3/26*

ABSTRACT OF THE DISCLOSURE

A smooth and wave free aerodynamic surface is produced by dividing sheet skin material into strips with matching contiguous edges and bonding these strips to the base structure while retaining the matching edge relationship but with the edges spaced to provide slits for boundary layer control. The base structure is first subjected to the loads and deflections it will experience in unaccelerated movement through the air and, while so subjected is measured and corrected as to contour.

---

This invention relates to the manufacture of air craft aerodynamic structures such as aerofoils but it can also be used for fuselages, tails and control surfaces such as ailerons, elevators and flaps, and may be used for making such structures having suction areas therein for laminar flow control of the air flowing thereon. It is particularly concerned with such structures where the accuracy of the external surface contour and smoothness is of importance.

Conventional suction surfaces for laminar flow control aerofoils employ a construction which entails the use of a number of prefabricated panels bolted onto the aerofoil substructure. The bolting is through the outer skin and discontinuities are produced between adjoining panels.

Each panel consists of a structural skin containing a series of spanwise chambers each covered by a porous element. Suction is applied to each chamber through a series of throttling holes which communicate with a collector underneath.

Experience has shown that laminar flow can be successfully maintained over the outer aerofoil surface when each porous element takes the form of a narrow slit approximately 0.005 inch wide and extending over a substantial length of the structure, in the case of an aerofoil, distributes in a chordwise direction.

The known methods of manufacturing such suction surfaces involve bonding a preformed thin outer skin onto a preformed structural surface base-plate containing grooves with throttling holes and subsequently slitting the outer skin above the grooves. The thin outer skin must be sufficiently stiff not to deflect where it overhangs the grooves. Moreover, a certain minimum depth of slit is required for aerodynamic reasons and skin stresses are such that light alloy material is used for the outer skins to avoid unnecessary increases in the weight of the aerofoil structure.

When slits are cut in the outer skin after it is bonded onto the base-plate, difficulty has been experienced in applying any form of protective finish to the edges of the slits or to remove burrs from the lips of the slits and the minimum width of slit is limited by the cutting technique employed. It is well known that, over a period of time, unprotected light alloy surfaces corrode and unless burrs are completely removed from the edges of the slits, small slivers of metal protrude through the slits and destroy the laminar condition of the boundary layer.

It is further known that if local roughness, waviness and discontinuities in the outer aerofoil surfaces exceed a tolerable magnitude, breakdown of laminar flow will occur. If a filler is used to eliminate these sources of trouble, the filler itself often deteriorates causing breakdown of laminar flow.

Surface waviness of the aerofoil can be reduced to tolerable limits by machining or rubbing down the surface after the wing has been assembled, but if this operation is applied to the outer surface the protective finish is removed in places.

However smooth and wavefree a wing surface may be after manufacture, the essential requirement is that the waviness remains within tolerable limits in flight, i.e. under the loads imposed on the wing structure when they carry the weight of the aircraft and deflect accordingly.

It is known that, depending on the type of substructure, local concentration of shear at the attachment of shear webs or spars can cause local deflection in the skin of sufficient magnitude to cause transition of the laminar boundary layer.

The main object of the present invention is to provide a method of producing smooth and tolerably wavefree aerodynamic surfaces, particularly when employing laminar flow control in the boundary layer, and to ensure that the degree of waviness remains within tolerably small limits under load in unaccelerated flight.

According to the present invetion a method of producing the outer surface of an aerodynamic structure comprising assembling a base to a sub-structure, subjecting the assembly to loads and deflections which it will experience in unaccelerated movement through the air, and while the assembly is so subjected measuring and correcting the contour before affixing, as by bonding, preformed outer skin material to the outer surface of the base.

In a preferred method the preformed skin material is divided into a number of strips with matching contiguous edges, said edges are smoothed, and said strips are bonded to the base with their matching edges in juxtaposed matching relationship, the strips being spaced apart by a predetermined distance to form elongated porous elements in the outer skin substantially normal to the intended direction of external airflow thereover.

The exposed surfaces including the edge surfaces of the strips may be given a protective finish as by anodising, and if desired a colour finish, prior to bonding the strips to be base-plate. The strips may be bonded to a base in the form of a base-plate having structural joints therein and in that case the strips are disposed and bonded to the base so that the joints in the base are covered by the strips.

All bolting and riveting occurs through the structural surface base, which may be made up from a number of conveniently sized individual panels. The outer skin is pre-formed, slit and assembled at a later stage in the form of spanwise strips bonded onto the base. Controlled gaps are left between the strips to form the slits.

No joints are required in the outer skin, and allowance is made for final profiling operations on the sublayer directly below the outer skin whilst the wing or the like is subjected to loads experienced in unaccelerated flight.

The base structure containing the spanwise chambers may be machined or extruded in one piece or may be fabricated by bonding spaced spanwise strips onto a structural base, either of platework or honeycomb sandwich construction. If bonded strips are used, they may be made of a material softer than that required for the base-plate in order to facilitate final profiling operations, for example by machining or rubbing down.

All skin panels may be preformed to the desired final profile before assembly. It is important that a large trimming allowance is left at the edge of each panel until after preforming to ensure that the panels maintain their required shape right up to the edge of the panel.

To provide an efficient means of boundary layer control by suction, it is not essential that the slits in the outer skins are absolutely straight, but each slit must be of constant width along its length, or have a constant taper. In the construction of the invention, although it is necessary to maintain the relative spanwise relationship of the strips when finally assembled on the base, it is possible to adjust the width of the original gaps between the strips prior to or as the strips are disposed on the base and prior to bonding the strips to the base. Allowance for this can be made in the original marking out of the panel from which the strips are cut.

If the strips formed between the slits were to be cut individually, a constant width slit would only be obtained if each strip could be produced with edges which were absolutely straight along their entire length. This object is difficult to achieve in practice. Therefore, the strips are preferably produced by slitting large preformed panels of skin material which are marked before cutting to ensure that they finally assembled on the base in correct relative positions with their juxtapositioned matching edges parallel or with the slit between them having a constant taper. When the strip edges, which with bonded slits in the assembled structure, are formed from the marginal portion of panels of skin material, two panels are lapped and slit together through their lapped positions. The offcuts are then scrapped and the new edges of the panels are matching and can be used to form boundaries of a constant width slit in the outer skin of the assembled structure.

Thus the final width of the slit is independent of the width of the cutter employed in slitting the panel so that slits of different width or taper can be produced from the same cutter and the minimum width of slit is no longer limited by the minimum width of cutter than can be employed.

In order that the invention may be more fully understood, some embodiments in accordance therewith will now be described by way of example with reference to the accompanying drawings in which:

FIG. 1 shows diagrammatically a cross section of an aerofoil;

FIG. 2 is a view similar to FIG. 1 showing the cross section of an aerofoil with two of the panels removed on the upper and lower surfaces, the upper panels only being shown as being adapted for controlling laminar flow;

FIG. 3 is a detailed cross section to an enlarged scale of the section between the two lines III–III in FIG. 1, showing the build up of the panels to the aerofoil structure when using the control for laminar flow;

FIG. 4 is a view similar to FIG. 3 of the leading edge portion of the aerofoil;

FIG. 5 is a detail to the scale of FIGS. 3 and 4 of a part of the jig used in building the panels of FIGS. 3 and 4;

In the drawings the same references have been used to designate the same or similar parts.

Figure 6:
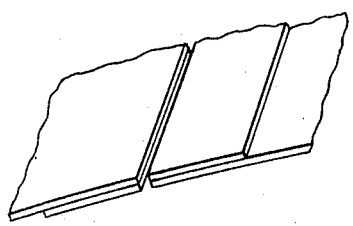
FIG. 6 shows a detail of how the matching edges of the outer skin of the panels is formed at the edges of the panels.

Referring to the drawings, the whole aerofoil forward of the rear spar will be assembled as a complete unit, thus avoiding any joints in the outer skin other than where the matching edges of the panels are touching, or in the case of laminar control aerofoils, where the matching edges form the porous elements as herein described. The joints between the panels of the base to be described will be found to be arranged in a way across the chord of the aerofoil to suit the size of the panels of the base-plate, but these joints will not be coincident with the porous elements or contiguous matching edges of the outer skin panels.

Referring to FIGS. 1 and 2, the whole assembly is built up in a series of jigs having upper and lower portions 1, 2 connected temporarily together at 3 and the desired number of such jigs are used in spaced relation across the aerofoil in a chordwise direction. The aerofoil section is made up of chordwise spars 4, to which through spar booms 5, the panels 6 are secured by drilling the boom and spar as at 7 (FIG. 3) to receive the bolts or like securing means in a conventional manner.

The jigs 1, 2 are first assembled with the panels 6 on to the spars 4 by the booms 5 and this assembly, as seen in FIG. 1, terminates in the region of the rear spar so that access can be obtained into the interior of the aerofoil through holes in the rear spar. A skin joint in this region is not critical and in any case the control surfaces to be assembled to the wing subsequently will occupy a large proportion of the aerofoil aft of the rear spar, in which case the main wing and such surface where used for laminar control may be arranged to terminate at the leading edges of the control surfaces.

The critical aerofoil leading edge region 8, which will be forward of the first porous element 9 when used, is machined from solid material to ensure an accurate nose profile. Any de-icing equipment may be incorporated into this component, but such equipment forms no part of the present invention and needs no further description here.

Referring to FIGS. 3 and 4, the aerofoil wall is formed on a base-plate 9 which in the construction shown is a built up honeycomb sandwich to be described, and an outer skin 10 of strips with matching edges 11 is bonded to the outer surface of the base-plate after the latter has been fabricated with the spars and spar booms into the aerofoil structure, and after preloading will be herein described.

For the sake of clarity, the particular wing panel structure of FIGS. 3 and 4 will be described, and these are shown as constructed to provide control of the laminar flow of the aerofoil through the ambient air in flight. The panel is formed of the base-plate 9 which is a honeycomb sandwich of plastic or metal, which may be a light metal alloy or steel, and for supersonic aircraft steel is preferred at least in part, but for less highly stressed aerofoils the honeycomb core 12 may be of rigid reinforced synthetic plastic material; the honeycomb core 12 is bonded by any suitable conventional adhesive to inner and outer plates 13, 14; at the longitudinal marginal edges of the panels 12, which extend chordwise of the aerofoil from root to the region of the tip, are provided with apertured reinforcing elements 15 by which the panels can be bolted as at 16 to the spars by the booms 5. Over the outer skin 14 of the honeycomb 12 there are placed spacer strips 17 which are secured to the skin 14 by adhesive except for the spacer strip 17a where the bolts 16 are used; in the latter case, the strip 17a is bored and countersunk to receive the countersunk head of the bolt 16, thereby fixing the strip to the panel. The strip 17a spans the joint between two of the panels as at 18 in FIG. 1 and a bolt 16 will be provided in each panel.

The spacer strips 17 are spaced apart, and this is particularly important when using laminar flow control as will be described. To ensure correct spacing of the spacers 17, the jig 1 has on its underside (FIG. 5) a flange 19 to which are attached spanwise splines or lands and the spacers 17 are located accurately between two lands 20. The spacer strips are provided with tapped apertures 21 in register with bolt holes 22 in the flange 19, so that for assembly purposes bolts 23 can secure the spacers to the jig. The flange 19 has its underfaces machined to the coutour line of the aerofoil, and thus the spacer strips are built on to the jig with the correct desired aerofoil contour.

The skin 14 is then connected by bonding, using a suitable conventional adhesive, to the underface of the spacers 17, but not 17a, and the honeycomb 12 to which the skin 13 may at this stage be attached, is bonded by adhesive to the underface of the skin 14. Where laminar flow control is to be employed, throttle holes 24 are provided in the skin 14 and larger apertures 25 are provided in the skin 13 and the throttle holes 24 are in register with the gaps between the spacers 17 and with the porous elements formed by the gap 26 between matching edges of the outer skin strips 10. In this construction an underskin collector corrugated member 27 is secured as by bonding and with the bolts 16 to the underface of the skin 13; the channels 28 thus formed beneath the apertures 25 extend chordwise of the aerofoil and are connected to a source of suction in the aircraft, so that air can be sucked through the gaps 26 to control the laminar flow in flight.

Referring now to FIGS. 1 and 2, the preferred procedure for construction of the aerofoil is as follows:

The base-plate and internal structure of the aerofoil is first assembled in the following manner:

The outer face plates 14 and the honeycomb are cut to size and, where required, the throttling holes 24 and the apertures 25 are drilled in the plate 14 and skin 13 respectively. From panels of metal or synthetic plastic material joint strips 17a and spacers 17 are cut, the strips 17a, being load carrying elements, are of metal and the spacers which are not load carrying may be of metal or plastic. It is here mentioned that the honeycomb with the skins 13, 14 constitutes the stress carrying members of the aerofoil wall.

The strips 17, 17a cut to shape are located in the jig 1 between the lands 20 and then drilled and attached to match the bolt holes 22 in the jig, the outer profile of the strips being suitably machined or otherwise prepared to fit into the jig. The strips 17, 17a, before being finally assembled into the jig, have an adhesive film applied to the inside surface thereof, and finally the strips are bolted into the jigs. The outer face plate of the honeycomb is then bonded in conventional manner under heat and pressure to the inside face of the strips 17 in the jig, the jig at this stage forming a base for this bonding operation. The honeycomb is then bonded with the reinforcing 15 to the plate 14 and the skin 13 is then bonded to the inner face of the honeycomb. Finally, the underskin collector member 27 is bonded to the skin 13. The jig 2 for each of the pairs of jigs is then fixed in place with the jig 1 by the members 3 to form an envelope embracing the aerofoil being built.

Referring now to FIG. 2, the two rear panels of the aerofoil and the two panels between the forward spar nearest the nose 8 are then removed. The joint strips 17a are, however, left in situ. The nose 8 forming the aerofoil leading edge has been assembled as described with reference to FIG. 4, and the nosepiece itself is a solid machined metal element having a rebated edge 28a to receive the forward edge of the forward honeycomb 12 and fixing bolts 29, and above that to receive the forward strip 17a secured by the bolt 30. Where laminar flow control is provided, the forward porous element 9 is formed between the forward edge of the strip 17a and the edge 31 of its rabbet and corrugated element 32 is fixed by the bolt 30 and a grub screw 33 to the nose 8. A channel 34 is thus formed which is connected to the suction apparatus of the craft. This leading edge section, seen in FIG. 4, is assembled fully into the jig and through the gap by removal of the adjacent upper and lower panels, the leading spar boom 7 and the spar 4 are bolted in place of fitting, all these parts being located and drilled at this stage to eliminate any manufacturing discrepancies. The leading edge unit is then removed from the jig. The adjacent panels are then replaced at the same time building up their supporting spar 4 and booms 7 to which the panels are fixed. At the same time and before final fixing the outer panels, the central booms and spars 7, 4 are built in to the structure, and at the same time any constructional device such as fuel tanks are also assembled between these spars. These panels having been finally assembled, the leading edge regional assembly seen in FIG. 4 is then re-assembled in the jig. Finally, the rear panels are replaced and connected to the rear spar 4, their removal facilitating access to the central spars 4 during their assembly.

The aerofoil structure now being complete, the jigs 1, 2 are removed and the aerofoil is assembled into a loading apparatus of conventional construction by which the aerofoil from root to tip is subjected to loads and deflections which simulate the loads on the aerofoil at a predetermined flight speed for which the aerofoil is designed. When loaded and deflected, the outer face of the aerofoil assembly is then checked for waviness and, where necessary, is treated in a conventional manner by profiling operations to reduce the waviness to permissible magnitude. The aerofoil is then ready to receive the outer skin 10.

In forming the outer skin, this is made in elongated strips 10 cut or otherwise divided from a large panel. Several panels may be used to provide the full width of the wing chordwise; it is desirable that the edges of the strips 10 should have matching edges with those of adjacent strips. These strips should, if possible, be continuous from root to tip of the aerofoil, and they are cut for assembly from the panels by any conventional cutting means having previously been marked transversely of the line of intended cut so that after cut the strips can be aligned, thus enabling their contiguous edges to match. Even if the line of cut is not straight this will not matter, because the edges will match. Where it is desired to form matching edges between two strips formed from different panels, the panels are overlapped as shown in FIG. 6 and the overlapping double thickness is cut through, thereby forming in the resultant strips edges which match.

The skin strips 10 thus formed with their edges matching may be mounted on formers which match the control surface of the jigs 1, 2 by which they are then disposed to the outer surface of the assembled aerofoil, but normally the strips are then numbered and marked as to their position on the aerofoil. The skin matching edges are then cleaned and de-burred and, if desired, all the surfaces, including the matching edges of the strips, are treated with a protective material and/or a colour finish such as anodising or paint. The strips are then offered to the wing and bonded to the aerofoil structure, the contour of which has been profiled correctively while loaded and deflected; the resultant aerofoil outer surface will be of the minimum waviness permissible when so loaded and deflected in flight.

It will thus be seen that the wing will in flight have the minimum waviness of outer contour which is highly desirable, particularly for high speed and supersonic aircraft.

Where laminar flow control is to be provided, the strips 10 are assembled to the aerofoil as herein described, but with their matching edges spaced apart and in register with the gaps between the strips 17 and 17a, and hence with the throttle holes 24. The distance between the matching edges can be adjusted as required during fabrication of the aerofoil and may be 0.005 inch, but may be less, e.g. .003 inch if required. Normally, the matching edges will be parallel, but where required, the matching edges may be one at an angle to another, so that the resultant slit between them forming the porous element for the boundary layer control section will vary in width spanwise of the aerofoil over the whole or part of its length.

Figure 7:
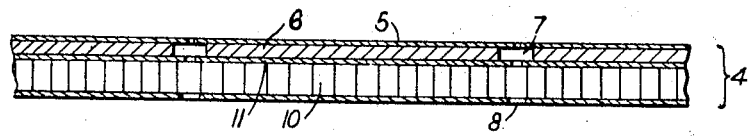
FIGS. 7, 8 and 9 each show an alternative form of aerofoil wall construction.
Figure 8:
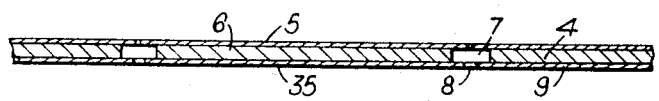
Figure 9:
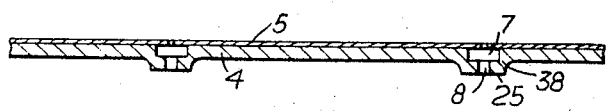

Referring now to FIGS. 7, 8 and 9, the boundary layer control means from the porous elements formed by the matching edges of the outer skin to the ducts 27 may be formed as shown in FIG. 7, which closely follows the construction of FIGS. 3 and 4, but where the whole is united by adhesive, or maybe constructed as shown in FIG. 8 where the honeycomb is disposed of and the base-plate is formed by sheet metal members 35, and in this case it may be necessary for the corrugated member 27 to form, at least in part, the portion of the structural element of the wing to withstand shear stress across the aerofoil wall between the spars. Finally, the panels may be formed as in FIG. 9 with a base-plate of metal 37 with thickened portions 38 having the porous elements in the outer strips 10 and the apertures 25, the ducting members being omitted on this drawing.

We claim:
1. A method of producing an aerodynamic structure having a skin exhibiting minimum waviness while in unaccelerated flight through the air, which comprises:
   forming a base assembly for the aerodynamic structure approximating that shape which, when covered with skin material, will impart the requisite aerodynamic shape to the structure,
   subjecting the assembly to loads and deflections which it will experience in unaccelerated movement through the air,
   measuring and correcting the contour of the assembly, which so subjected to that contour which, when covered with skin material, will impart the requisite aerodynamic shape to the structure,
   and then covering the structure with pre-formed skin material.

2. A method according to claim 1 wherein the preformed skin material is divided into a number of strips with matching contiguous edges, said edges are smoothed, and said strips are bonded to the base with their matching edges in juxtaposed matching relationship, the strips being spaced apart by a predetermined distance to form elongated porous elements in the outer skin substantially normal to the intended direction of external airflow thereover.

3. A method according to claim 2 wherein the skin is divided into a number of strips, preferably elongated, prior to assembling them and the base to bond them thereto, and in assembling the strips on the base their matching edges are disposed the desired distance apart, e.g., 0.005 inch, so that the width of the slits in the assembled structure is independent of the means by which the pre-formed skin was slit into said strips.

4. A method of producing the outer surface of an aerodynamic structure which comprises the steps of:
   forming a base for the outer surface of the structure,
   dividing outer skin sheet material into strips with matching contiguous edges,
   placing said strips on the base in a pattern to retain the matching relationship of said edges thereof and with said edges spaced apart to define slits for boundary layer control,
   and attaching said strips to said base in such pattern.

References Cited

UNITED STATES PATENTS

| | | | |
|---|---|---|---|
| 3,020,986 | 2/1962 | Kirk | 244—123 X |
| 3,097,982 | 7/1963 | Stoner | 156—211 |
| 3,145,000 | 8/1964 | Mackie | 244—123 X |
| 3,257,718 | 6/1966 | Krenzke | 29—404 |
| 3,302,269 | 2/1967 | Cooper et al. | 29—404 |

THOMAS H. EAGER, *Primary Examiner.*

U.S. Cl. X.R.

29—407, 412, 448; 156—211; 244—123